United States Patent [19]

Kamisaka et al.

[11] Patent Number: 4,527,002
[45] Date of Patent: Jul. 2, 1985

[54] THERMAL CRACKING METHOD FOR PRODUCING OLEFINES FROM HYDROCARBONS

[75] Inventors: Makoto Kamisaka; Toshiro Okamoto, both of Tokyo; Michio Ohshima; Mamoru Tamai, both of Hiroshima, all of Japan

[73] Assignee: Mitsubishi Jukogyo Kabushiki Kaisha, Tokyo, Japan

[21] Appl. No.: 581,256

[22] Filed: Feb. 17, 1984

[30] Foreign Application Priority Data

Feb. 18, 1984 [JP] Japan ............................. 58-25797

[51] Int. Cl.$^3$ ............................. C07C 4/04
[52] U.S. Cl. ............................. 585/648; 208/107; 208/129; 208/130; 585/652
[58] Field of Search ............... 208/130, 129, 128, 107; 585/648, 652

[56] References Cited

U.S. PATENT DOCUMENTS

| | | | |
|---|---|---|---|
| 3,178,488 | 4/1965 | Akin | 585/648 |
| 3,644,555 | 2/1972 | Nagy et al. | 585/652 |
| 3,718,709 | 2/1973 | Simonetta | 585/652 |
| 4,134,824 | 1/1979 | Kamm et al. | 585/652 |
| 4,264,435 | 4/1981 | Read, Jr. et al. | 585/652 |

Primary Examiner—Delbert E. Gantz
Assistant Examiner—Anthony McFarlane
Attorney, Agent, or Firm—Toren, McGeady, Stanger, Goldberg & Kiel

[57] ABSTRACT

In methods of manufacturing olefines by thermally cracking hydrocarbons, there is disclosed a thermal cracking method for producing olefines from hydrocarbons, characterized in that hydrocarbon is burnt with oxygen in the presence of steam to generate a high-temperature gas containing steam of 1500°–3000° C.; methane and hydrogen are supplied into the high-temperature gas containing said steam, with the molar ratio of methane to hydrogen in said high-temperature gas being 0.05 or more, then hydrocarbon to be cracked is supplied into said high-temperature gas containing said methane, hydrogen and steam, so that the hydrocarbon is subjected to thermal cracking by maintaining the partial pressure of hydrogen at more than at least 0.1 bar at the outlet of a reactor, under conditions of reaction temperature, 800°–1200° C. and residence time in the reactor 5–300 milli second, and then the reaction product is cooled in a rapid manner.

4 Claims, 6 Drawing Figures

THERMAL CRACKING METHOD FOR PRODUCING OLEFINES FROM HYDROCARBONS

The present invention relates to a method of manufacturing olefines by thermal cracking of hydrocarbons, and more particularly, to a method of manufacturing olefines wherein hydrocarbon is burnt with oxygen in the presence of steam to generate a high-temperature gas containing steam as a heat source for thermal cracking purposes, and methane and hydrogen in amounts required for reaction are supplied into said high-temperature gas containing said steam so that the hydrocarbon can be thermally cracked in the presence of methane, hydrogen and steam.

It is already well known that the tubular-type thermal cracking method, the so-called steam cracking has heretofore been used as means for converting light gaseous hydrocarbons such as ethane and propane and liquid hydrocarbons such as naphtha and kerosine to olefines.

In this kind of method, heat is supplied through a pipe wall from outside so that the speed of heat transmission and reaction temperatures are limited and usually a reaction temperatures less than 850° C. and a residence time 0.1-0.5 second are adopted as reaction conditions.

However, under the restriction of such apparatus and reaction conditions, the materials for practical use are restrictively light oils at best, but heavy oils such as residue oils cannot be subjected to the abovementioned conditions of restriction. The reason is that heavy oils upon reaction at high temperature for a long time are sure to cause side reactions of polymerization and condensation until coking occurs with the result that the required gasification-rate of the heavy oil cannot be attained.

As alternatives for such outer heating methods, there are several methods wherein a combustible gas of hydrogen or hydrocarbon is burnt with oxygen to produce a high-temperature gas, which may be utilized as a source for heating material hydrocarbon, thereby thermally cracking the hydrocarbon.

The first method of the kind consists in burning methane and hydrogen obtained by cracking with oxygen to produce a high-temperature gas which is mixed with steam to generate an atmosphere of high temperature, 800°-1600° C. and material hydrocarbon is thermally cracked in the aforesaid atmosphere of high temperature under ordinary pressure for a period of residence time, 10-60 milli-second, thereby manufacturing an olefine.

However, in such a method, the hydrocarbons for use as materials are limited to light fraction less than light oil, and this method cannot be applied to heavy oils because the rate of gasification is rather low and a coking condition occurs so enormously that no good result can be expected of the method.

The second method consists in burning liquid hydrocarbon as fuel such as crude oil to produce a high-temperature gas and thermally cracking a material hydrocarbon in said high-temperature gas under conditions of pressure 5-70 bar, reaction temperature, 1315°-1375° C. and residence time, 3-10 milli-second. Yet, also in this method, inert gas such as $CO_2$ and $N_2$ in film form is supplied into a reactor through a combustion zone of said high-temperature gas whereby the occurrence of coking is controlled, thus enabling heavy oil such as residue oil to be thermally cracked.

In this method, it may be possible to prevent the adhesion of heavy oil to the wall of the reactor and to control coking due to the polymerization of the decomposed gas at the wall surface, but it is impossible to avoid coking, polymerization of decomposed gas and sooting tendency due to polymerization and condensation of the material oil itself, thus betraying the increase in yield of a useful gas. Moreover, in order to control coking, a pretty large amount of inert gas has to be supplied so that the charge on a refining and recovering system of decomposed gas may be increased and at the same time, thermal economy of the process becomes worsened as a drawback inherent in this method.

The third method consists in burning hydrogen in part to produce a high-temperature gas of hydrogen and manufacturing olefines from several kinds of hydrocarbon including heavy oil in the above-mentioned atmosphere of hydrogen at reaction temperature, 800°-1800° C. under pressure of 7-70 bars, so that such reaction can be effected by rapid heating and thermal cracking can be attained in the above-mentioned atmosphere of hydrogen to eliminate coking whereby thermal cracking of the heavy oil material can be made possible.

However, still in this method, in the presence of a large amount of hydrogen, the olefine of high value obtained by reaction are hydrogenated by said hydrogen, whereby it is converted to methane of low value as a drawback in this method. Moreover, the formation of methane by said hydrogenation is so exothermic that the temperature of reaction is elevated as the result of which such hydrogenation is accelerated and the production of methane is further promoted with the tendency of rampant reaction. Thus it is causing a rapid decrease in ethylene and a increase in methane production and making it difficult to maintain the percentage of yield of olefine at a high level.

A more serious problem is that the production of methane is accompanied by the consumption of valuable hydrogen until such valuable hydrogen causes ethylene to be wasted for manufacturing methane of low value, as a considerable loss in economy as another drawback inherent in this method.

In view of all the foregoing drawbacks, the inventors of the present invention have discovered that, firstly by arranging methane and hydrogen in coexistence, it is possible to prevent such a drawback as olefine becoming methane without losing the advantage of said coexistence of hydrogen and methane and to obtain a much higher percentage of yield of ethylene than the conventional methods (Japanese Patent Application No. 038684/1982).

Namely, the inventors repeated strenuous researches for developing a thermal cracking method of manufacturing olefines from various hydrocarbons, which is capable of selectively attaining a high percentage of the required olefines by preventing coking tendency in a wide range from light hydrocarbons to heavy hydrocarbons. As the result, the inventors have discovered that hydrocarbon is burnt with oxygen in the presence of steam to produce a high-temperature gas containing steam, and material hydrocarbon is thermally cracked in the presence of said high-temperature gas, methane and hydrogen, thereby obtaining a high percentage of yield of the required olefine not only from heavy hydrocarbons without fear of coking but also from light oils such as naphtha, both in a high percentage of yield of olefine. Certainly based on this discovery, the inventors have succeeded in achieving the present invention.

Namely, in methods of manufacturing olefines by thermally cracking hydrocarbons, the inventors propose a method of obtaining olefines from hydrocarbons which comprises burning hydrocarbon with oxygen in the presence of steam to produce a high-temperature gas containing steam of high temperature, 1500°–3000° C., supplying methane and hydrogen with their mol ratio, more than 0.05 into the high-temperature gas containing said steam, than supplying material hydrocarbon to be cracked into said high-temperature gas containing said methane, hydrogen and steam, thermally cracking said material hydrocarbon at temperature, 800°–1200° C. for a period of stay time, 5–300 milli-second by maintaining the partial pressure of hydrogen at more than at least 0.1 bar at the outlet of the reactor and then rapidly cooling the reaction product.

The thermal cracking method of the present invention will be explained in detail hereinafter.

First of all, according to the present invention, the heat required for reaction can be supplied in the from of a high-temperature gas which is obtained by burning hydrocarbon with oxygen and since it is supplied by internal heating, such high temperature can be easily obtained as is impossible to obtain by external heating and in addition, a wasteless utilization of heat can be achieved. Although such internal heating by burning hydrocarbon has heretofore been proposed, gas-like hydrocarbons and clean oil such as kerosine and light oil have been used in most cases. Also, the procedure of using heavy oil has been proposed but upon combustion of such material, there occurs the tendency of coking and sooting, thus requiring the circulation of a large amount of inert gas such as $CO_2$ and $N_2$ already mentioned before.

According to the present invention, the combustion of fuel hydrocarbon is effected in the presence of a large amount of steam with a ratio 1–20 (by weight) of steam to fuel hydrocarbon, including steam to be required at a later-stream reaction portion, whereby it is possible to control coking and sooting by dint of pacification of burning conditions and effect of solid carbon reforming.

Besides, the amount of oxygen for supply may be more or less than the theoretical equivalent concerned. However, particularly by supplying an amount less than the theoretical equivalent concerned for combustion, it is possible to prevent the consumption of hydrogen or losses of effective components due to the flow-out of unreacted oxygen to the later-stream and to supplement hydrogen to be consumed during reaction. At the same time, CO may occur as a by-product but may be easily converted to hydrogen by shift reaction at the later stream and utilized as a source of hydrogen.

Also, unlike $CO_2$, $N_2$ and other gases, the added steam can be easily condensed for recovery in the step of separation and refining of cracked gas, thus providing the advantage of causing no increase in the charge on the system of refining. In this case, according to the method of the present invention, such oxygen is used as could be obtained from air by deep-freeze separation, diaphragm separation and absorbing separation.

With respect to the action of hydrogen, it has the following advantages.

Firstly, as compared with other materials, hydrogen has an extremely high rate of heat transmission and consequently, it serves to heat even heavy hydrocarbon in a rapid manner. Particularly in the case of heavy hydrocarbon for use as reaction material, hydrogen serves to control the reaction of polymerization and condensation as liquid-phase reaction by reducing the residence time in liquid phase condition so as to ensure a high percentage of gasification.

Secondly, it is possible to control the reaction of polymerization and condensation in the aforesaid liquid phase by means of the activity of the hydrogenation and to supply hydrogen sufficiently as compared with the content of carbon of heavy hydrocarbon, whereby the amount of production of light gas is increased. Also against coke formation from a gas phase, the amount of acetylene as a precursor of coke-forming reaction can be decreased for controlling purposes.

Thirdly, hydrogen has the effect of increasing the concentration of radicals in the system of reaction, whereby high speed of cracking and gasification can be achieved. Indeed, these effects of hydrogen are especially outstanding at high temperature under pressure conditions as proposed by the present invention.

However, it is true that hydrogen has a disadvantage which cannot be overlooked. Namely, on account of presence of hydrogen and especially under pressure, olefine may be wasted until a saturated product tends to occur. This aspect amounts to nothing but a drawback inherent in thermal cracking methods in an atmosphere of hydrogen which has heretofore been proposed. In other words, in an atmosphere of hydrogen alone, propyrene and ethylene arising from thermal cracking of material hydrocarbon are caused to become hydrogenated in the following reactions (1)–(3).

$$C_3H_6 + H_2 \rightarrow C_2H_4 + CH_4 \tag{1}$$

$$C_2H_4 + H_2 \rightarrow C_2H_6 \tag{2}$$

$$C_2H_6 + H_2 \rightarrow 2CH_4 \tag{3}$$

As the result, there occurrs unavoidably the increase in methane and ethane, and above all, the marked increase in methane. For one thing, all propyrene and ethylene may not disappear due to the fact that the speed of reaction for their production is relatively rapid as compared with the above-mentioned reactions (1)–(3). So, even if quenching is carried out to freeze these reaction, olefine may be lost due to the reactions (1)–(3) during such a short cooling time.

Another feature of the present invention is that not only hydrogen but also methane is added to an atmosphere of reaction before its commencement whereby it is rendered possible to control the hydrogenated condition of the reaction material even regarded as a drawback of coexistence of hydrogen without damaging the advantage thereof. Namely, upon adding an abundant amount of methane to the atmosphere of reaction, it follows that, simultaneously with the aforesaid reactions (1)–(3), there occur the following conversion reactions, (4)–(6) concurrently wherein methane is converted to ethane and ethylene, thus preventing the conversion of the hydrocarbon material to methane by hydrogenation.

$$2CH_4 \rightarrow C_2H_6 + H_2 \tag{4}$$

$$C_2H_6 \rightarrow C_2H_4 + H_2 \tag{5}$$

$$C_2H_4 + CH_4 \rightarrow C_3H_8 \rightarrow C_3H_6 + H_2 \tag{6}$$

In addition, by adjusting the reaction temperature, pressure and the ratio of methane to hydrogen in the atmosphere of reaction, it is possible to promote thermal cracking of methane until the added methane can be converted to ethylene, ethane and acetylene of higher additive value.

For example, on the assumption that the reactions (4) and (5) for conversion of methane to ethylene are regarded as elementary steps of reaction, the following reaction will take place. Namely, while a very active methyl radical ($CH_3\cdot$) are produced from methane at high temperature, this methyl radical change into ethane by recombination, and moreover, there occurs a pull reaction of hydrogen or hydrogen radical ($H\cdot$) until ethane is converted to ethylene either directly or through ethyl radical ($C_2H_5\cdot$).

These reactions are formulated as follows.

This formation reaction of a methyl radical in the coexistence of hydrogen and methane is shown as follows.

Accordingly, in the presence of a large amount of methane, the concentration of hydrogen radical will be decreased while the concentration of methyl radical is increased. Namely, because methane becomes an absorbent for hydrogen radical, it can prevent the hydrogenation reaction of olefine by hydrogen radical, promoting the dehydrogenation reaction, and at the same time, it show a function for converting methane to ethane and ethylene by means of recombination of methyl radical having occurred at a time.

These effects of methane not only serve as a diluent but also methane contributes very much to the increase in yield percentage of ethylene or others from the viewpoint of reactive mechanism. Therefore, as compared with conventional cases where hydrogen is merely diluted with steam or inert gas, the function and effect of methane slow an enormous difference and moreover, the above-mentioned effect of methane can be developed almost without reducing the advantage of hydrogen.

Again, according to the present invention, steam supplied to the burning portion can control coking also at the reaction portion by undermentioned water gas reaction, thus permitting the recovery of valuable hydrogen from heavy-material coking.

or (CO can be converted to hydrogen by shift reaction) As a consequence, it becomes possible to reduce the amount of hydrogen required for the atmosphere of reaction, so that the atmosphere of reaction turns out mild, and the hydrogenation of higher olefines such as propyrene and butadiene can be controlled, which has heretofore been considered difficult to achieve with methane alone, until the yield of propyrene and butadiene is increased and the consumption of hydrogen is reduced.

A preferred embodiment of the present invention will be explained in detail with reference to the accompanying diagrams.

Figure 1:
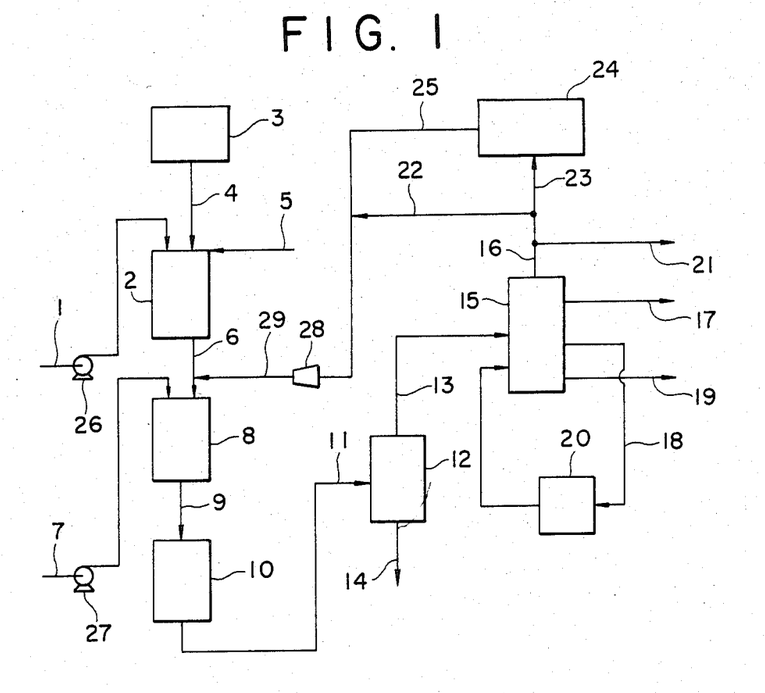
FIG. 1 is a diagrammatical view showing an example of preferred embodiment according to the present invention.

Namely FIG. 1 shows an example of preferred embodiment with industrial application of the method of the present invention.

In the drawing, first of all, fuel hydrocarbon 1 is pressurized up to the required extent by means of a pump 26 and the hydrocarbon thus pressurized is supplied to a combustion zone 2. To the combustion zone 2 is supplied oxygen 4 of high concentration from oxygen-producing means 3 and the fuel hydrocarbon 1 is burnt with said oxygen in the presence of heated steam supplied from a line 5 to produce a high-temperature gas stream 6 of 1500°–3000° C.

In this case, there are some procedures for supplying steam alone or a mixture of steam and oxygen or fuel or supplying it along the wall of the combustion zone 2 in order to protect the latter.

A high-temperature gas stream 6 issuing forth from the combustion zone 2 is mixed with methane and hydrogen supplied from a line 29, the resulting mixture being permitted to enter a reaction zone 8. In this case, methane and hydrogen may be supplied individually or in mixed condition. Also, these materials may be supplied almost to the same position as hydrocarbon material to be cracked or to the upstream of the reaction zone 8.

To the reaction zone 8 is supplied hydrocarbon material 7 by means of a supply pump 27, which has been pressurized up to the required extent. Then the hydrocarbon material 7 is brought into contact, and is mixed, with the high-temperature burning gas stream containing the aforesaid steam, methane and hydrogen, and the resulting mixture is heated rapidly. As the result, in a reaction zone 8 a thermal cracking reaction of the hydrocarbon material 7 take place under the action of the aforesaid hydrogen, methane and steam until a reaction fluid 9 containing a large amount of olefine can be produced. This reaction fluid 9 is immediately conducted to rapid cooling means 10 and cooled rapidly therein. Said rapid cooling means 10 may be employed, for example, in the form of direct rapid cooling means for spraying water or oil directly onto the reaction fluid, or an indirect rapid cooling heat-exchanger for heat exchange between two fluids inside and outside the pipe of said heat-exchanger, or a two-stage combination of the above-mentioned two means.

Subsequently, the reaction fluid 11 after cooling is conducted to a gas- and liquid separator 12 so that it is separated into cracked gas and steam 13 and cracked residual oil 14, said reside oil being utilized as a heat source for process steam.

On the other hand, cracked gas and steam 13 are cooled with water and after condensing and separating the steam, it is conducted to separating and refining means 15. In the separating and refining means, the cracked gas is separated into hydrogen and methane 16, olefines 17 such as ethylene and propyrene, paraffins 18 such as ethane and propane and a component 19 heavier than $C_4$ component. Said separating and refining means may be employed in the form of the usual deep-freeze separation means, absorbing means for separating methane and hydrogen from components more than $C_2$, or diaphragm separation means for concurrent use. Paraffins 18 such as ethane and propane are conducted to steam-cracking means 20 so that ethylene and propyrene can be recovered.

On the other hand, part of hydrogen and methane 16, if necessary, is separated as methane product 21, after which the greater part thereof is elevated in pressure by means of a compressor 28 for hydrogen and methane through a line 22 and may be recycled for purposes of reaction. Also, part thereof is permitted to enter a steam reformer and shift converter 24 through line 23, where methane is changed to hydrogen, which is then through a line 25 mixed with methane 22 as recycled hydrogen and the mixture is delivered to the reaction zone 8, so as to make up for hydrogen which has been consumed during thermal cracking reaction.

Although omitted in FIG. 1, after cooling, the reaction fluid 11 and gases of $H_2S$ and $CO_2$ generated in the gas at the outlet of the reformer may be removed by gas refining means in the usual manner.

The hydrocarbons for use in the present invention may range from light oils to heavy hydrocarbons such as various residual oils, shale oils, bitumen and liquefied coal oils and in some cases, slurry and solid hydrocarbons.

The characteristics of the present invention are that olefines can be effectively manufactured from heavy oils by the combination of hydrogen and methane, while their treatment has heretofore been comparatively difficult, that is to say, the present invention is entitled to be called most effective in manufacturing olefines from heavy oils.

By the way, the fuel hydrocarbons for use in the present invention may be anyone of the above-mentioned materials. Also, the hydrocarbons for use as fuel and raw material to be cracked are not necessarily the same. Moreover, as fuel hydrocarbons, there is no restriction in selecting anyone from decomposed oils, undecomposed residual oils and off-gas from a separation and refining system.

As explained in detail hereinbefore, the thermal cracking method of the present invention has the following characteristics quite superior to the conventional art.

Namely, hydrocarbon is burnt in the presence of steam under pressure to provide heat required for reaction, and steam, hydrogen and methane are purposely or selectively added to an atmosphere of reaction, whereby (1) In the range of desired partial pressure of hydrogen (viz. partial pressure of methane) that a high percentage of yield of olefine corresponding to hydrocarbon material to be cracked can be obtained, it is possible to control the harmful paraffin formation of olefine due to hydrogen with the use of methane. On the other hand, according to the present invention, it becomes possible to enhance the percentage of yield of useful components such as olefine or the like from a wide scope of hydrocarbon materials ranging from light hydrocarbons such as naphtha to heavy hydrocarbons such as asphalt in a manner much better than conventional methods. For example, in the case of use of asphalt as raw material, the yield of olefine has heretofore been about 25%. By contrast, according to the present invention, it can be enhanced up to about 45%.

(2) In order to enhance the selectivity of percentage of ethylene yield (percentage of ethylene yield in percentage of olefine yield), partial pressure of hydrogen may be taken at a rather high level within the aforesaid desired range of partial pressure of hydrogen. At the same time, in order to enhance the selectivity of percentage of propyrene and butadiene yield, partial pressure of hydrogen may be taken at a low level within the aforesaid range of partial pressure of hydrogen so that the selectivity of products can be controlled.

(3) As compared with light hydrocarbon materials, heavy hydrocarbon materials have large content of polycyclic aromatic hydrocarbon which is difficult to crack, and therefore the required rate of gasification (ratio of weight of decomposed hydrocarbon material to weight of hydrocarbon material supplied to the reaction zone) is confirmed by maintaining partial pressure of hydrogen at a relatively high level, after which the selectivity of products can be controlled by further adjusting partial pressure of hydrogen as described in the aforesaid Item (2).

(4) Since thermal cracking is carried out in the presence of steam, hydrogen and methane in combination, it is rendered possible to control the occurrence of coking more effectively than conventional methods.

(5) Since it is possible to control paraffin formation from olefine due to hydrogenation by dint of methane in coexistence, the amount of produced olefine can be increased on one hand and the consumption of valuable hydrogen can be reduced in a proportional manner on the other hand.

(6) As the exothermic effect along with the hydrogenation of olefine can be put under control, it is possible to obtain a distribution of yield percentage gradually variable against changes in reaction temperature, stay time and time of rapid cooling. This special effect is extremely useful in improving the operational and running properties of the plant concerned.

(7) In heavy hydrocarbons, the particulate property of oil drops in particular is important for enhancing the rate of gasification and the percentage of yield of useful components as well as for controlling the tendency of coking. As means for achieving said purpose, it is necessary to increase the amount of high-temperature gas for hydrocarbon material, thereby increasing of the oil-drop shearing effect for gas. Thereupon, unlike conventional methods, the present invention employs steam so that it can be recovered easily by cooling whereby the particulate property of oil drops is promoted and its function is improved without causing no charge on the system of refining.

(8) By burning fuel hydrocarbon in the concurrent presence of steam, it is possible to lower burning temperature and to control coking and sooting insomuch that heavy hydrocarbon like asphalt can be used as fuel.

(9) Since hydrocarbon is burnt with oxygen of high concentration, no inert gas is basically included so that there is little charge imposed on the system of separation and refining.

(10) By an operation of running under pressure, it is possible to reduce pressure-elevation energy of cracked gas required for refining purposes.

In summary, according to the method of the present invention, it is possible to attain a structure of the desired product at a high level of yield from any hydrocarbon material without fear of coking.

Certain preferred embodiments will be further explained hereinbelow but they are offered by way of mere illustration and not intended to restrict the present invention.

In these preferred embodiments, as the material and fuel for use, vacuum distillation residual oil of Middle East (Specific gravity 1.02, S part 43% and fluidiged point, 40° C.) was used. First of all, steam was preheated to 500° C. by a burner disposed above a reactor 2 and the aforesaid residue oil was burnt with oxygen of high concentration which was obtained by deep-freeze separation of air while blowing said preheated steam, to generate a high-temperature gas containing said steam. Subsequently, a gas of mixture of hydrogen and methane, after preheated at 400°–800° C., was blown onto the upper portion of the reactor 8 at downstream of the burner, so that it was mixed with said high-temperature gas containing steam, and then a vacuume distillation residue oil was sprayed into said high-temperature gas from a plurality of asphalt burners disposed in the inner lateral walls of the reactor and after said residue oil was thermally cracked, the reaction product thus obtained was conducted to a cooler 10 provided in the lower part of the reactor 8 and water was blown directly to said reaction product, the reaction product thus treated being rapidly cooled and measured.

Also in this case, suitable range of residence time was obtained by reckoning the volume of the reaction vessel and reaction conditions. Likewise, naphtha (the range of boiling points 40°–180° C.) was thermally cracked by the same method in the same apparatus and then the reaction product was measured. The ratio by weight of steam to fuel hydrocarbon was varied in each test, in order to ensure the required reaction conditions but the reaction was carried out within the range of ratio, approximately 0.5–30.

Figure 2:
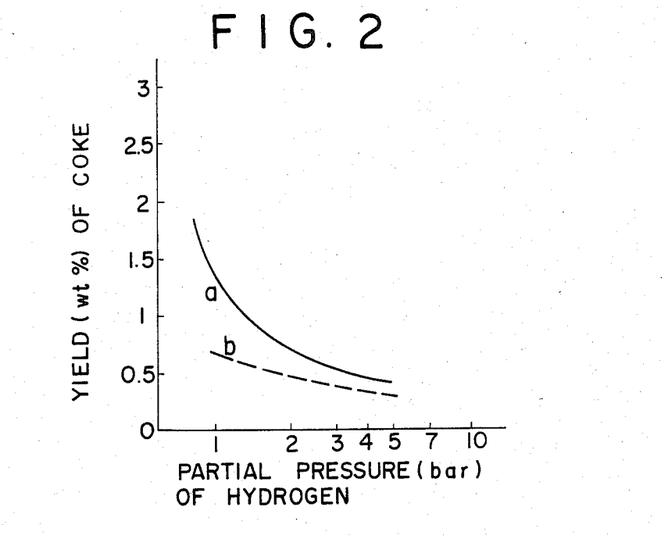
FIG. 2 is a graph showing the relationship between percentage of coking yield and partial pressure of hydrogen.

FIG. 2 is a graph showing the relationship between partial pressure of hydrogen and percentage of yield of coking in the case of thermally cracking vacuume residual oil of Middle East and naphtha under conditions of temperature, 1000°–1020° C. at the outlet of the reactor, mol ratio 0.5 of $CH_4/H_2$, total pressure, 30 bars and stay time, 20 milli-second.

In the drawing, a indicates a curve showing the yield (%) of coke in the case of thermally cracking vacuume residual oil of Middle East and b indicates a curve showing the yield (%) of coke in the case of thermally cracking naphtha. As is clear from FIG. 2, upon increase in partial pressure of hydrogen, the yield of coke is increased in an outstanding manner and by maintaining partial pressure of hydrogen at a level more than 1.5 bars in treating even heavy hydrocarbon such as pressurereduced residue oil, the percentage of coking yield can be controlled at an extremely low level.

Also in FIG. 2, an example of naphtha for use as light hydrocarbon is shown for purposes of comparison with heavy hydrocarbons. In this case, also by enhancing partial pressure of hydrogen, the formation of coking can be controlled and the effect of partial pressure of hydrogen can be called more effective than for heavy hydrocarbons.

Figure 3:
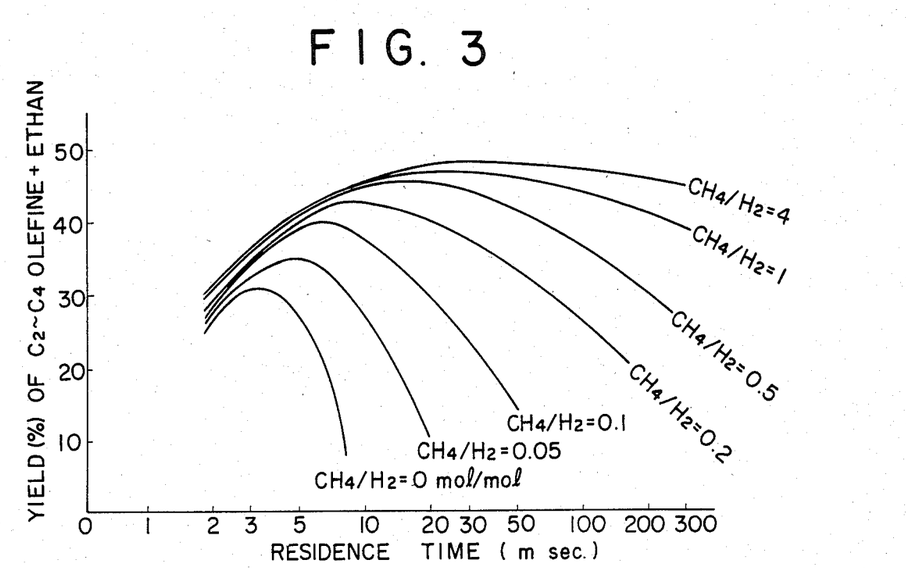
FIG. 3 is a graph showing the relationship between yield (%) of $C_2$–$C_4$ olefine+ethane and residence time (reaction time) on the basis of mol ratio of methane to hydrogen as parameter.

FIG. 3 is a graph showing the relationship between the yield (%) of $C_2$–$C_4$ olefine + ethane yield based on the mol ratio of $CH_4/H_2$ as a parameter and residence time, in the case of thermally cracking vacuume residue oil of Middle East as the reaction material under conditions of pressure, 30 bars, temperature, 1000° C.–1030° C. at the outlet of the reaction vessel and total pressure, 30 bars. In this instance, the yield of ethane in conformity to the yield of $C_2$–$C_4$ olefine is evaluated for the reason that the amount of the former is comparatively large and can be easily converted to ethylene.

As is clear from FIG. 3, upon increase in the percentage of methane for addition, the yield (%) of $C_2$–$C_4$ olefine + ethane is largely increased and at the same time, changes in the percentage of yield for stay time become less and the distribution of yield-percentage is stabilized, all of which become well understandable. In this case, the higher the yield (%) of methane is, the larger is the proportion of $C_3$, $C_4$ components ($C_{3-C_4}$ olefin/$C_2$–$C_4$ olefin + ethan) present in the yield percentage of $C_2$–$C_4$ olefine plus ethane (ethane is 5–10%). Namely when the mol ratio $CH_4/H_2$ is 1, the proportion of $C_3$, $C_4$ is 10–40% (the longer the stay time is, the smaller said proportion becomes.) Judging from these results, the addition of $CH_4$ leads to the obtaining of a higher percentage of yield of olefine than in the case of no addition of $CH_4$ ($CH_4/H_2=0$) shown for purposes of comparison and simultaneously, changes in the percentage of yield for residence time are remarkably improved. This effect of addition of $CH_4$ can be obtained also at the mol ratio 0.05 of $CH_4/H_2$ but such effect is particularly outstanding at more than 0.1. Moreover, it is well understood that residence time can be selected in a manner of as wide as 5–300 milli-second.

Figure 4:
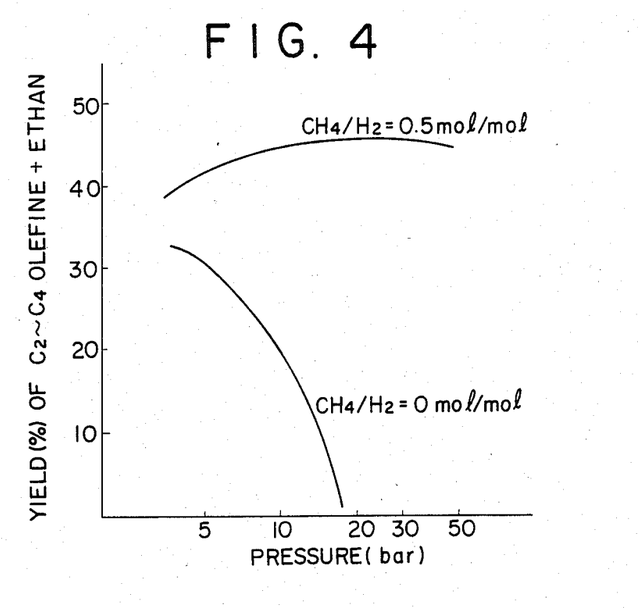
FIG. 4 is a graph showing the relationship between yield (%) of $C_2$–$C_4$ olefine+ethane and pressure on the basis of mol ratio of methane to hydrogen as parameter.

FIG. 4 is a graph showing the relationship between pressure and the yield (%) of $C_2$–$C_4$ olefine + ethane in the case of thermally cracking vacuume residual oil of Middle East as the raw material under conditions of temperature, 1000°–1020° C. at the outlet of the reaction vessel, residence time, 20 milli-seconds and the mol ratio $CH_4/H_2$, 0 and 0.5. As is clear from FIG. 4, while the influence of pressure on the yield (%) of $C_2$–$C_4$ olefine + ethane can be hardly perceived in the case of the mol ratio $CH_4/H_2$, 0.5. But in the system of no addition of methane, according to increase pressure, methane is observed rapidly occurring upon cracking of $C_2$–$C_4$ olefine and ethane by hydrogenation so that the yield of $C_{2-C4}$ olefine + ethane is markedly lowered.

Figure 5:
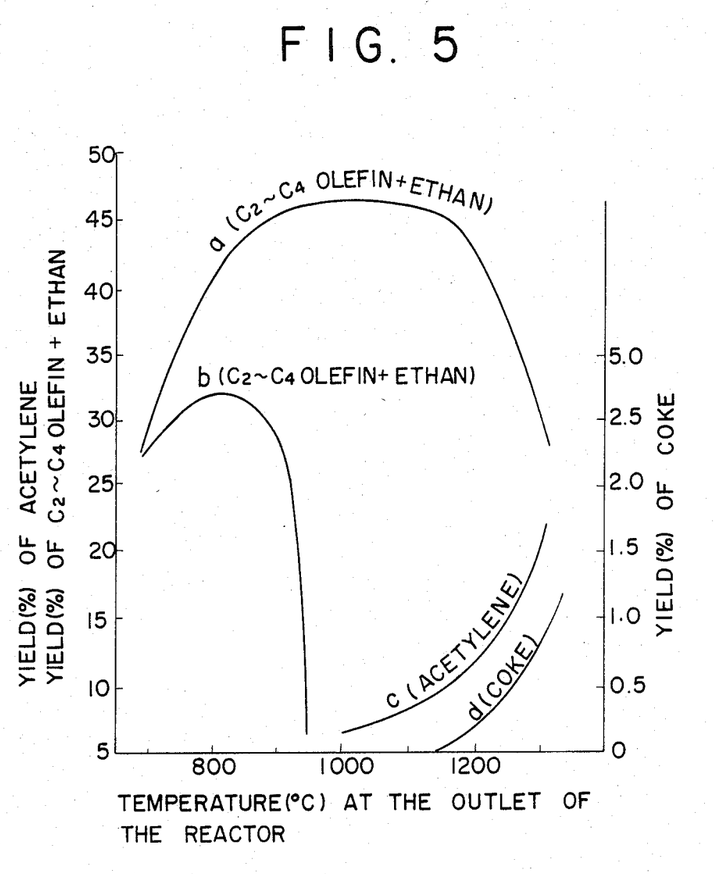
FIG. 5 is a graph showing the relationship between percentage of product yield and temperature at the outlet of a reactor.

FIG. 5 is a graph showing the relationship between the temperature at the outlet of the reaction vessel and the percentage of yield of $C_2$–$C_4$ olefine + ethane in the case of thermally cracking vacuume residual oil of Middle East as the reaction material under conditions of total pressure, 30 bars, residence time, 20 milli-seconds and the mol ratio $CH_4/H_2$ 0 and 0.5. In the drawing, a indicates a curve showing the relationship between the yield (%) of $C_2$–$C_4$ olefine + ethane and temperature at the outlet of the reactor under condition of the mol ratio $CH_4/H_2$ 0.5, b indicates a curve showing the relationship between the yield (%) of $C_2$–$C_4$ olefine + ethane in the case of mol ratio $CH_4/H_2$, 0, c is a curve showing the relationship between the yield (%) of acetylene and the temperature at the outlet of the reaction vessel in the case of mol ratio $CH_4/H_2$, 0.5, and likewise, d is a curve showing the relationship between the yield (%) of coking and the temperature at the outlet of the reactor.

As is clear from the drawing, the yield (%) of $C_2$-$C_4$ olefine+ethane is as high as 40% in the case of mol ratio, 0.5 at 800°-1200° C. However, at less than 800° C., the speed of reaction is markedly lowered so that the yield (%) of $C_2$-$C_4$ olefine+ethane becomes largely lowered. On the other hand, at the side of high temperature, there occur a removal of hydrogen from ethylene and the formation of acetylene by the cracking of methane, and such tendency becomes outstanding particularly at more than 1200° C. so that the yield (%) of $C_2$-$C_4$ olefine+ethane is rapidly lowered. As a consequence, the amount of formation of coking is increased which the polymerization and condensation of acetylene is considered to cause.

In the case of mol ratio $CH_4/H_2$, 0, shown for purposes of comparison, namely in the case of no addition of methane, along with the rise of temperature, there occurs progress of a rapid hydrogenation of $C_2$-$C_4$ olefine+ethane until the percentage of yield of $C_2$-$C_4$ olefine+ethane is largely lowered.

Figure 6:
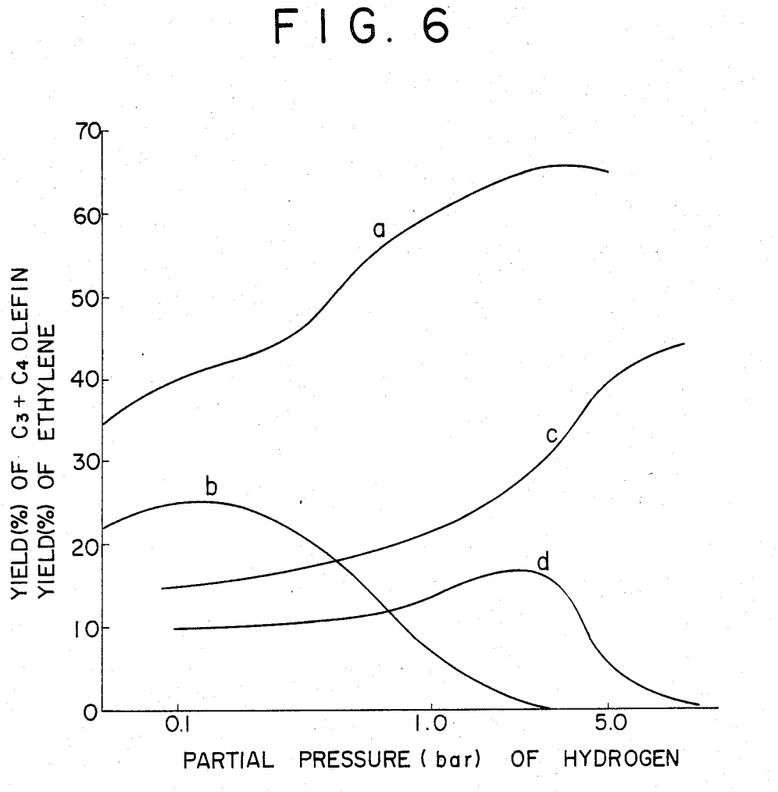
FIG. 6 is a graph showing the relationship between yield (%) of ethylene and yield (%) of $C_3$+$C_4$ olefine and partial pressure of hydrogen.

FIG. 6 is a graph showing the relationship between the percentage of yield of ethylene or of $C_3+C_4$ olefine and partial pressure of hydrogen at the outlet of the reactor in the case of thermally cracking vacuume residue oil of Middle East and naphtha under conditions of temperature, 1000°-1020° C. at the outlet of the reaction vessel, total pressure, 10 bars, residence time 15 millisecond and mol ratio 0.5, $CH_4/H_2$. In the drawing, a indicates a curve showing the relationship between the yield (%) of ethylene and partial pressure of hydrogen in the case of thermally cracking naphtha, b indicates a curve showing the relationship between the yield (%) of $C_3+C_4$ olefine and partial pressure of hydrogen in the case of thermally cracking naphtha, c indicates a curve showing the relationship between the yield (%) of ethylene and partial pressure of hydrogen in the case of thermally cracking for vacuume residual oil of Middle East and d indicates a curve showing the relationship between the yield (%) of $C_3+C_4$ olefine and partial pressure of hydrogen in the case of thermally cracking for vacuume residue oil of Middle East. As is clear from the drawing, in the case of thermal cracking of naphtha, the percentage of yield of ethylene is increased along with the increase in partial pressure of hydrogen but when partial pressure of hydrogen is further increased, propyrene and butadiene are decomposed to ethylene and methane until the percentage of yield of $C_3+C_4$ olefine is increased. On the other hand, the percentage of yield of ethylene is further increased due to the contribution of thermal cracking of the components of $C_3+C_4$ olefine.

Also in the case of thermal cracking of vacuume residue oil of Middle East the influence of partial pressure of hydrogen is basically the same as that in the case of thermal cracking of naphtha. Namely, along with the increase in partial pressure of hydrogen, the percentage of yield of olefine is increased on one hand and the percentage of yield of $C_3+C_4$ olefine is increased at the initial stage along with the increase in partial pressure of hydrogen on the other hand, but when partial pressure of hydrogen is further increased, the percentage of yield of $C_3+C_4$ olefine is decreased due to its components being decomposed to ethylene and methane.

Along with the increase in partial pressure of hydrogen, the trend of changes in the percentages of yield of ethylene and of $C_3+C_4$ olefine is noted to be the same in both cases of thermal cracking of naphtha and pressure-reduced residue oil of Middle East but the levels of partial pressure of hydrogen causing such changes in the percentage of yield are different depending on the kind of hydrocarbon to be cracked. Namely in the case of naphtha, more than 0.1 bar of partial pressure of hydrogen and in the case of pressure-reduced residue oil of Middle East, more than 1.5 bars of partial pressure of hydrogen are preferable, in order to obtain a high percentage of yield of olefine. Also by changing partial pressure of hydrogen, it proves possible to control the rate of the yield (%) of ethylene or of $C_3+C_4$ olefine present in the percentage of yield of the product.

Particularly when heavy hydrocarbon is used for cracking purposes and hydrogen present in hydrogen, methane and steam prior to being mixed with the hydrocarbon material is less than 30 mol % (corresponding to less than about 3 bars of partial pressure of hydrogen) and also when light hydrocarbon is used for cracking purposes and the aforesaid hydrogen is less than 10 mol % (corresponding to less than about 0.8 bar of partial pressure of hydrogen), a high percentage of yield of propyrene+butadiene as $C_3+C_4$ olefine proves obtainable.

Judging from the preferred embodiment, the scope capable of making the present invention effective can be defined as follows.

First of all, partial pressure of hydrogen is different depending on the kind of hydrocarbon to be cracked, namely, the heavier the hydrocarbon becomes, the higher partial pressure of hydrogen is desirable. In other words, in the case of light hydrocarbon such as naphtha, more than 0.1 bar of partial pressure of hydrogen is desirable and, in the case of heavy hydrocarbon such as various kinds of residue oil, shale oil, bitumen, tar, liquefied coal oil, decomposed residual oil and petroleum coke, more than 1.5 bars of partial pressure of hydrogen is desirable.

Next, concerning the percentage of methane for addition, in the case of $CH_4/H_2$ mol ratio less than 0.05, the effect of methane is slight and therefore, more than 0.1 is preferable. On the other hand, the increase in $CH_4/H_2$ mol ratio will require the increase in heat capacity for heating up to reaction temperature thus requiring the increase in energy unit. More than mol ratio 4 $CH_4/H_2$ contributes quite little to the increase in the percentage of yield of olefine and therefore, substantially less than mol ratio 4 is desirable. Likewise, in order to obtain a satisfactory percentage of yield of olefine, residence time for purposes of reaction is 5-300 milli-seconds and preferably 10-100 milli-seconds. At the same time, reaction temperatures 800°-1200° C. are also desirable for obtaining a good percentage of yield.

What is claimed is:

1. A thermal cracking method for producing olefines from hydrocarbons which comprises burning hydrocarbon with oxygen in the presence of steam to produce a high-temperature gas containing steam of 1500°-3000° C., supplying methane and hydrogen into said high-temperature gas containing steam, with the mol ratio of methane to hydrogen in said high temperature gas being from about 0.05 to about 4.0, then supplying hydrocarbon to be cracked into said high-temperature gas containing said methane, hydrogen and steam, thermally cracking said hydrocarbon under conditions of partial pressure of hydrogen of more than at least 0.1 bar at the outlet of a reaction vessel, temperature, 800°–1200° C. and residence time, 5–300 milli-seconds, and rapidly cooling the reaction product thus obtained.

2. A thermal cracking method according to claim 1 wherein said steam of 0.5–30 weight parts to one part of said fuel hydrocarbons is used.

3. A thermal cracking method according to claim 1 wherein said partial pressure of the hydrogen is at least 1.5 bar.

4. A thermal cracking method according to claim 1 wherein said residence time in the reactor is within the range of 10 to 100 milli-seconds.

* * * * *